(12) United States Patent
Johnson et al.

(10) Patent No.: US 9,560,371 B2
(45) Date of Patent: Jan. 31, 2017

(54) VIDEO COMPRESSION SYSTEM

(75) Inventors: Timothy A. Johnson, Nope Hope, AL (US); Steven R. Blackwell, Huntsville, AL (US)

(73) Assignee: Avocent Corporation, Huntsville, AL (US)

( * ) Notice: Subject to any disclaimer, the term of this patent is extended or adjusted under 35 U.S.C. 154(b) by 2340 days.

(21) Appl. No.: 10/629,855

(22) Filed: Jul. 30, 2003

(65) Prior Publication Data
US 2005/0025248 A1    Feb. 3, 2005

(51) Int. Cl.
*H04N 19/507* (2014.01)
*H04N 19/503* (2014.01)
*H04N 19/176* (2014.01)

(52) U.S. Cl.
CPC .......... *H04N 19/507* (2014.11); *H04N 19/176* (2014.11); *H04N 19/503* (2014.11)

(58) Field of Classification Search
CPC ...... H04B 1/66; H04N 19/507; H04N 19/503; H04N 19/176
USPC ......................... 375/240.12, 240.14, 240.15, 240.8,375/240.16, 240.17, 240.25, 240.13, 240.18,375/240.24; 382/176, 239
See application file for complete search history.

(56) References Cited

U.S. PATENT DOCUMENTS

| | | |
|---|---|---|
| 3,710,011 A | 1/1973 | Altemus et al. |
| 3,925,762 A | 12/1975 | Heitlinger et al. |
| 3,935,379 A | 1/1976 | Thornburg et al. |
| 4,005,411 A | 1/1977 | Morrin, II |
| 4,134,133 A | 1/1979 | Teramura et al. |
| 4,142,243 A | 2/1979 | Bishop et al. |
| 4,369,464 A | 1/1983 | Temime |
| 4,384,327 A | 5/1983 | Conway et al. |
| 4,667,233 A | 5/1987 | Furukawa |

(Continued)

FOREIGN PATENT DOCUMENTS

| | | |
|---|---|---|
| EP | 0395416 | 10/1990 |
| EP | 0495490 | 7/1992 |

(Continued)

OTHER PUBLICATIONS

Office Action Issued Jul. 11, 2006, in Corresponding Japanese Patent Application No. 2006-024444.

(Continued)

*Primary Examiner* — Tung Vo
(74) *Attorney, Agent, or Firm* — Davidson Berquist Jackson & Gowdey LLP

(57) ABSTRACT

A improvement to video compression techniques is described in which blocks of video input information are compared in their respective pixel values to corresponding blocks of immediately preceding frames. The blocks are analyzed to determine whether change has occurred in accordance with two tests. First, the pixel values of the block are compared to the pixel values of a preceding block and if a threshold number of pixel values in the block exceed their counterparts by a threshold amount, then the block is assumed to have changed and is communicated via a standard communication protocol, compression technique and media. Second, even if the threshold number of pixels in the block has not changed, the pixel values are compared with their prior frame counterparts to determine if any one pixel value has changed in magnitude more than a second threshold amount. Again, one such pixel is identified, then the block is assumed to have changed and is communicated.

8 Claims, 2 Drawing Sheets

(56) References Cited

U.S. PATENT DOCUMENTS

| | | | |
|---|---|---|---|
| 4,764,769 A | 8/1988 | Hayworth et al. | |
| 4,774,587 A | 9/1988 | Schmitt | |
| 4,816,901 A * | 3/1989 | Music et al. | 375/240.01 |
| 4,855,825 A * | 8/1989 | Santamaki et al. | 375/240.12 |
| 4,873,515 A | 10/1989 | Dickson | |
| 4,959,833 A | 9/1990 | Mercola et al. | |
| 5,046,119 A | 9/1991 | Hoffert et al. | |
| 5,083,214 A | 1/1992 | Knowles | |
| 5,235,595 A | 8/1993 | O'Dowd | |
| 5,251,018 A | 10/1993 | Jang et al. | |
| 5,325,126 A | 6/1994 | Keith | |
| 5,339,164 A | 8/1994 | Lim | |
| 5,387,947 A * | 2/1995 | Shin | 348/699 |
| 5,418,952 A | 5/1995 | Morley et al. | |
| 5,430,848 A | 7/1995 | Waggener | |
| 5,465,118 A | 11/1995 | Hancock et al. | |
| 5,497,434 A | 3/1996 | Wilson | |
| 5,519,874 A | 5/1996 | Yamagishi et al. | |
| 5,526,024 A | 6/1996 | Gaglianello et al. | |
| 5,566,339 A | 10/1996 | Perholtz et al. | |
| 5,572,235 A | 11/1996 | Mical et al. | |
| 5,630,036 A | 5/1997 | Sonohara et al. | |
| 5,659,707 A | 8/1997 | Wang et al. | |
| 5,664,029 A | 9/1997 | Callahan et al. | |
| 5,664,223 A | 9/1997 | Bender et al. | |
| 5,721,842 A | 2/1998 | Beasley et al. | |
| 5,731,706 A | 3/1998 | Koeman et al. | |
| 5,732,212 A | 3/1998 | Perholtz et al. | |
| 5,754,836 A | 5/1998 | Rehl | |
| 5,757,973 A | 5/1998 | Wilkinson | |
| 5,764,479 A | 6/1998 | Crump et al. | |
| 5,764,924 A | 6/1998 | Hong | |
| 5,764,966 A | 6/1998 | Mote, Jr. | |
| 5,781,747 A | 7/1998 | Smith et al. | |
| 5,784,488 A * | 7/1998 | Kuwata | 382/176 |
| 5,796,864 A | 8/1998 | Callahan | |
| 5,799,207 A | 8/1998 | Wang et al. | |
| 5,805,735 A | 9/1998 | Chen et al. | |
| 5,812,169 A | 9/1998 | Tai et al. | |
| 5,812,534 A | 9/1998 | Davis et al. | |
| 5,828,848 A | 10/1998 | MacCormack et al. | |
| 5,844,940 A | 12/1998 | Goodson et al. | |
| 5,861,764 A | 1/1999 | Singer et al. | |
| 5,864,681 A | 1/1999 | Proctor et al. | |
| 5,867,167 A | 2/1999 | Deering | |
| 5,870,429 A | 2/1999 | Moran et al. | |
| 5,898,861 A | 4/1999 | Emerson et al. | |
| 5,929,915 A * | 7/1999 | Cho | 375/240.13 |
| 5,946,451 A | 8/1999 | Soker | |
| 5,948,092 A | 9/1999 | Crump et al. | |
| 5,967,853 A | 10/1999 | Hashim | |
| 5,968,132 A | 10/1999 | Tokunaga et al. | |
| 5,997,358 A | 12/1999 | Adriaenssens et al. | |
| 6,003,105 A | 12/1999 | Vicard et al. | |
| 6,008,847 A | 12/1999 | Bauchspies | |
| 6,012,101 A | 1/2000 | Heller et al. | |
| 6,016,316 A | 1/2000 | Moura et al. | |
| 6,032,261 A | 2/2000 | Hulyalkar | |
| 6,038,346 A | 3/2000 | Ratnakar | |
| 6,040,864 A * | 3/2000 | Etoh | 375/240.16 |
| 6,055,597 A | 4/2000 | Houg | |
| 6,060,890 A | 5/2000 | Tsinker | |
| 6,065,073 A | 5/2000 | Booth | |
| 6,070,214 A | 5/2000 | Ahern | |
| 6,084,638 A | 7/2000 | Hare et al. | |
| 6,094,453 A | 7/2000 | Gosselin et al. | |
| 6,097,368 A | 8/2000 | Zhu et al. | |
| 6,124,811 A | 9/2000 | Acharya | |
| 6,134,613 A | 10/2000 | Stephenson et al. | |
| 6,146,158 A | 11/2000 | Peratoner et al. | |
| 6,154,492 A * | 11/2000 | Araki et al. | 375/240.16 |
| 6,195,391 B1 | 2/2001 | Hancock et al. | |
| 6,202,116 B1 | 3/2001 | Hewitt | |
| 6,233,226 B1 | 5/2001 | Gringeri et al. | |
| 6,240,481 B1 | 5/2001 | Suzuki | |
| 6,240,554 B1 | 5/2001 | Fenouil | |
| 6,243,496 B1 | 6/2001 | Wilkinson | |
| 6,304,895 B1 | 10/2001 | Schneider et al. | |
| 6,327,307 B1 | 12/2001 | Brailean et al. | |
| 6,330,017 B1 * | 12/2001 | Suzuki | 347/238 |
| 6,345,323 B1 | 2/2002 | Beasley et al. | |
| 6,360,017 B1 * | 3/2002 | Chiu et al. | 382/239 |
| 6,370,191 B1 | 4/2002 | Mahant-Shetti et al. | |
| 6,373,890 B1 | 4/2002 | Freeman | |
| 6,377,313 B1 | 4/2002 | Yang et al. | |
| 6,377,640 B2 | 4/2002 | Trans | |
| 6,404,932 B1 | 6/2002 | Hata et al. | |
| 6,418,494 B1 | 7/2002 | Shatas et al. | |
| 6,425,033 B1 | 7/2002 | Conway et al. | |
| 6,453,120 B1 | 9/2002 | Takahashi | |
| 6,470,050 B1 * | 10/2002 | Ohtani et al. | 375/240.16 |
| 6,496,601 B1 | 12/2002 | Migdal et al. | |
| 6,512,595 B1 | 1/2003 | Toda | |
| 6,516,371 B1 | 2/2003 | Lai et al. | |
| 6,522,365 B1 | 2/2003 | Levantovsky et al. | |
| 6,539,418 B2 | 3/2003 | Schneider et al. | |
| 6,542,631 B1 | 4/2003 | Ishikawa | |
| 6,567,464 B2 | 5/2003 | Hamdi | |
| 6,571,393 B1 | 5/2003 | Ko et al. | |
| 6,574,364 B1 | 6/2003 | Economidis et al. | |
| 6,584,155 B2 * | 6/2003 | Takeda et al. | 375/240.16 |
| 6,590,930 B1 | 7/2003 | Greiss | |
| 6,661,838 B2 * | 12/2003 | Koga et al. | 375/240 |
| 6,664,969 B1 | 12/2003 | Emerson et al. | |
| 6,701,380 B2 | 3/2004 | Schneider et al. | |
| 6,754,241 B1 | 6/2004 | Krishnamurthy et al. | |
| 6,785,424 B1 | 8/2004 | Sakamoto | |
| 6,829,301 B1 | 12/2004 | Tinker et al. | |
| 6,833,875 B1 | 12/2004 | Yang et al. | |
| 6,871,008 B1 | 3/2005 | Pintz et al. | |
| 6,898,313 B2 | 5/2005 | Li et al. | |
| 6,940,900 B2 | 9/2005 | Takamizawa | |
| 6,972,786 B1 | 12/2005 | Ludwig | |
| 6,990,148 B2 * | 1/2006 | Yang | 375/240.16 |
| 7,006,700 B2 | 2/2006 | Gilgen | |
| 7,013,255 B1 | 3/2006 | Smith, II | |
| 7,016,413 B2 * | 3/2006 | Hall et al. | 375/240.12 |
| 7,020,732 B2 | 3/2006 | Shatas et al. | |
| 7,031,385 B1 | 4/2006 | Inoue et al. | |
| 7,085,319 B2 | 8/2006 | Prakash et al. | |
| 7,093,008 B2 | 8/2006 | Agerholm et al. | |
| 7,143,432 B1 | 11/2006 | Brooks et al. | |
| 7,221,389 B2 | 5/2007 | Ahern et al. | |
| 7,222,306 B2 | 5/2007 | Kaasila et al. | |
| 7,272,180 B2 | 9/2007 | Dambrackas | |
| 7,277,104 B2 | 10/2007 | Dickens et al. | |
| 7,321,623 B2 | 1/2008 | Dambrackas | |
| 7,336,839 B2 | 2/2008 | Gilgen | |
| 7,373,008 B2 | 5/2008 | Clouthier et al. | |
| 7,457,461 B2 | 11/2008 | Gilgen | |
| 7,466,713 B2 | 12/2008 | Saito | |
| 7,515,632 B2 | 4/2009 | Dambrackas | |
| 7,515,633 B2 | 4/2009 | Dambrackas | |
| 7,542,509 B2 | 6/2009 | Dambrackas | |
| 7,609,721 B2 | 10/2009 | Rao et al. | |
| 7,720,146 B2 | 5/2010 | Dambrackas | |
| 7,782,961 B2 | 8/2010 | Shelton et al. | |
| 7,809,058 B2 | 10/2010 | Dambrackas | |
| 7,941,634 B2 | 5/2011 | Georgi et al. | |
| 2001/0048667 A1 | 12/2001 | Hamdi | |
| 2002/0118754 A1 * | 8/2002 | Choi | 375/240.14 |
| 2003/0005186 A1 | 1/2003 | Gough | |
| 2003/0048943 A1 | 3/2003 | Ishikawa | |
| 2003/0202594 A1 | 10/2003 | Lainema | |
| 2003/0231204 A1 | 12/2003 | Hanggie et al. | |
| 2004/0017514 A1 | 1/2004 | Dickens et al. | |
| 2004/0062305 A1 | 4/2004 | Dambrackas | |
| 2004/0064198 A1 | 4/2004 | Reynolds et al. | |
| 2004/0122931 A1 | 6/2004 | Rowland et al. | |
| 2004/0228526 A9 | 11/2004 | Lin et al. | |
| 2005/0005102 A1 | 1/2005 | Meggitt et al. | |
| 2005/0025248 A1 | 2/2005 | Johnson et al. | |
| 2005/0057777 A1 | 3/2005 | Doron | |
| 2005/0069034 A1 | 3/2005 | Dambrackas | |

(56) References Cited

U.S. PATENT DOCUMENTS

| | | |
|---|---|---|
| 2005/0089091 A1 | 4/2005 | Kim et al. |
| 2005/0108582 A1 | 5/2005 | Fung |
| 2005/0135480 A1 | 6/2005 | Li et al. |
| 2005/0157799 A1 | 7/2005 | Raman et al. |
| 2005/0198245 A1 | 9/2005 | Burgess et al. |
| 2005/0231462 A1 | 10/2005 | Chen |
| 2005/0249207 A1 | 11/2005 | Zodnik |
| 2005/0286790 A1 | 12/2005 | Gilgen |
| 2006/0039404 A1 | 2/2006 | Rao et al. |
| 2006/0092271 A1 | 5/2006 | Banno et al. |
| 2006/0120460 A1 | 6/2006 | Gilgen |
| 2006/0126718 A1 | 6/2006 | Dambrackas et al. |
| 2006/0126720 A1 | 6/2006 | Dambrackas |
| 2006/0126721 A1 | 6/2006 | Dambrackas |
| 2006/0126722 A1 | 6/2006 | Dambrackas |
| 2006/0126723 A1 | 6/2006 | Dambrackas |
| 2006/0161635 A1 | 7/2006 | Lamkin et al. |
| 2006/0262226 A1 | 11/2006 | Odryna et al. |
| 2007/0019743 A1 | 1/2007 | Dambrackas |
| 2007/0165035 A1 | 7/2007 | Duluk et al. |
| 2007/0180407 A1 | 8/2007 | Vahtola |
| 2007/0248159 A1 | 10/2007 | Dambrackas |
| 2007/0253492 A1 | 11/2007 | Shelton et al. |
| 2009/0290647 A1 | 11/2009 | Shelton et al. |

FOREIGN PATENT DOCUMENTS

| | | |
|---|---|---|
| EP | 0780773 A1 | 6/1997 |
| EP | 0 844 567 | 5/1998 |
| EP | 0270896 | 6/1998 |
| EP | 0899959 | 3/1999 |
| GB | 2318956 | 6/1998 |
| GB | 2350039 | 11/2000 |
| GB | 2388504 | 11/2003 |
| JP | 64-077374 | 9/1987 |
| JP | 62-077935 | 10/1987 |
| JP | 63-108879 | 5/1988 |
| JP | 01-162480 | 6/1989 |
| JP | 01-303988 | 12/1989 |
| JP | H03-130767 | 4/1991 |
| JP | 3192457 | 8/1991 |
| JP | 6-77858 | 3/1994 |
| JP | H8-223579 | 2/1995 |
| JP | 08-033000 | 2/1996 |
| JP | 08-263262 | 10/1996 |
| JP | 09-233467 | 9/1997 |
| JP | 09-231672 | 12/1997 |
| JP | 9-321672 | 12/1997 |
| JP | 11-308465 | 4/1998 |
| JP | 10-215379 | 8/1998 |
| JP | 10-257485 | 9/1998 |
| JP | 11-184800 | 7/1999 |
| JP | 11-184801 | 7/1999 |
| JP | 11-203457 | 7/1999 |
| JP | 11-308465 | 11/1999 |
| JP | 11-313213 | 11/1999 |
| JP | 2000-125111 | 4/2000 |
| JP | 2001-053620 | 2/2001 |
| JP | 2001-148849 | 5/2001 |
| JP | 2001-169287 | 6/2001 |
| JP | 2002-043950 | 2/2002 |
| JP | 2002-165105 | 6/2002 |
| JP | 2003-174565 | 6/2003 |
| JP | 2003-244448 | 8/2003 |
| JP | 2003-250053 | 9/2003 |
| JP | 2004-032698 | 1/2004 |
| JP | 2004-220160 | 8/2004 |
| TW | 589871 | 6/2004 |
| TW | I220036 | 8/2004 |
| WO | WO 97/41514 | 11/1997 |
| WO | WO 98/26603 | 6/1998 |
| WO | WO 98/54893 | 12/1998 |
| WO | WO 99/50819 | 10/1999 |
| WO | WO 01/22628 | 3/2001 |
| WO | WO 02/062050 A2 | 8/2002 |
| WO | WO 03/055094 | 7/2003 |
| WO | WO 03/071804 | 8/2003 |
| WO | WO 2004/032356 | 4/2004 |
| WO | WO 2004/081772 | 9/2004 |
| WO | WO 2004064402 A1 | 7/2014 |

OTHER PUBLICATIONS

Office Action Issued Jul. 4, 2006, in Corresponding Japanese Patent Application No. 2006-024442.
Office Action Issued Jul. 4, 2006, in Corresponding Japanese Patent Application No. 2006-024443.
Office Action Issued Mar. 7, 2006, in Corresponding Japanese Patent Application No. 2004-541433.
Office Action Issued Mar. 7, 2006, in Corresponding Japanese Patent Application No. 2006-024442.
Office Action Issued Mar. 7, 2006, in Corresponding Japanese Patent Application No. 2006-024443.
Office Action Issued Mar. 7, 2006, in Corresponding Japanese Patent Application No. 2006-024444.
International Preliminary Examination Report in Corresponding PCT Application No. PCT/US2003/030650, mailed Aug. 25, 2006.
PCT International Search Report in corresponding PCT Application No. PCT/US2003/030650 mailed Apr. 20, 2006.
PCT International Search Report for PCT/US05/17626, International filing date Jan. 3, 2006.
PCT International Search Report for PCT/US05/19256, International filing date Oct. 25, 2005.
Chinese Appln. No. 03816346.2—Jun. 12, 2009 SIPO Office Action (Translation).
Chrysafis et al., "Line-Based, Reduced Memory, Wavelet Image Compression," Mar. 2000 [retrieved on Aug. 20, 2008], Retrieved from the internet: <http://sipi.usc.edu/~ortega/Students/chrysafi/doc/ChristosChrysafis_line_based_I_P2000.pdf>.
EP Appln. No. 03818864.5—Aug. 24, 2009 EPO Office Action.
IL Appln. No. 171878—Apr. 28, 2009 Translation of Office Action.
International Search Report and Written Opinion mailed Sep. 4, 2008 in PCT/US07/10376.
Matsui et al., "High-speed Transmission of Sequential Freeze-pictures by Exchanging Changed Areas", IEEE Transactions on Communications, IEEE Service Center, Piscataway, NJ, vol. COM-29, No. 12, Dec. 1, 1981, XP002089584, ISSN: 0090-6778.
Office Action Issued Aug. 5, 2008 in Japanese Patent Application No. 2006-271932 (with English translation).
Office Action issued Jul. 31, 2007 in Japanese Patent Application No. 2006-024444 (with English translation).
Search Report and Written Opinion mailed Aug. 26, 2008 in PCT Appln. No. PCT/US2006/021182.
Thyagarajan K. S. et al., "Image Sequence Coding Using Interframe VDPCM and Motion Compensation", ICASSP, IEEE International Conference on Acoustics, Speech and Signal Processing-proceedings 1989 Publ. by IEEE, vol. 3, 1989, pp. 1858-1861, XP010082957.
U.S. Appl. No. 11/339,537—May 13, 2009 PTO Office Action.
U.S. Appl. No. 11/790,994—Jun. 2, 2009 PTO Office Action.
U.S. Appl. No. 11/819,047—Aug. 26, 2009 PTO Office Action.
Official Action issued Dec. 9, 2008 in JP Appln. No. 2005-510478 [with English translation].
CN Appln. No. 200710167085.2—Jun. 26, 2009 SIPO Office Action.
U.S. Appl. No. 12/318,074—Sep. 14, 2009 PTO Office Action.
CA Appln. No. 2,571,478—Jan. 31, 2012 CIPO Office Action.
CA Appln. No. 2,625,462—Jan. 5, 2012 CIPO Office Action.
CA Appln. No. 2,625,658—Jun. 4, 2012 CIPO Office Action.
CA Appln. No. 2,630,532—Mar. 20, 2012 CIPO Office Action.
CA Appln. No. 2,650,663—Feb. 1, 2012 CIPO Office Action.
EP Appln. No. 05756603.6—Dec. 13, 2011 EP Office Action.
Extended European Search Report mailed Feb. 14, 2012 in EPO Appln. No. 05854984.1.
IL191529—Dec. 4, 2011 Ministry of Justice Commissioner of Patents Office Action with translation.
Official Letter mailed Mar. 16, 2012 in TW 94117242.

(56) References Cited

OTHER PUBLICATIONS

U.S. Appl. No. 11/889,525—Feb. 15, 2012 PTO Office Action.
U.S. Appl. No. 12/458,818—Jan. 26, 2012 PTO Office Action.
"Lossless and Near-Lossless Coding of Continuous Tone Still Images (JPEG-LS)", ISO/IEC JTC1/SC29/WG1 FCD 14495—Public Draft, XX, XX Jul. 16, 1997, pp. I-IV,1, XP002260316, Retrieved from the Internet: URL:http://www.jpeg.org/public/fcd14495p.pdf paragraphs [04.2], [04.4], [A.
CN Appln. No. 200910223192.1—May 10, 2012 SIPO Office Action with English translation.
EP Appln. No. 05754824.0—Jul. 6, 2012 EPO Supplementary Search Report.
Kyeong Ho Yang et al: "A contex-based predictive coder for lossless and near-lossless compression of video", Image Processing, 2000. Proceedings. 2000 International Conference on Sep. 10-13, 2000, IEEE, Piscataway, NJ, USA, vol. 1, Sep. 10, 2000 pp. 144-1.
CA Appln. No. 2,630,532—Jul. 25, 2011 CIPO Office Action.
U.S. Appl. No. 11/707,879—Nov. 28, 2011 PTO Office Action.
U.S. Appl. No. 12/458,818—Nov. 22, 2011 PTO Office Action.
CN Appln. No. 201220113443.8—Aug. 22, 2012 SIPO Office Action with English translation.
CN Appln. No. 201220113511.0—Aug. 8, 2012 SIPO Office Action.
U.S. Appl. No. 13/069,726—Oct. 12, 2012 PTO Office Action.
U.S. Appl. No. 13/070,175—Oct. 12, 2012 PTO Office Action.
International Search Report and Written Opinion mailed Sep. 14, 2010 in PCT Appln. No. PCT/US2010/001941.
CA Appln. No. 2,524,001—Aug. 30, 2010 CIPO Office Action.
CN Appln. No. 200710167085.2—Aug. 2, 2011 SIPO Office Action (with English Translation).
CA Appln. No. 2,627,037—Sep. 9, 2010 CIPO Office Action.
CN Appln. No. 200710167085.2—Aug. 6, 2010 SIPO Office Action.
JP Appln. No. 2007-098267—Jul. 27, 2010 JPO Notice of Reasons for Rejection with translation.
CA Appln. No. 2,625,658—Oct. 12, 2011 CIPO Office Action.
JP Appln. No. 2007-098267—Oct. 11, 2011 JPO Final Notice of Reasons for Rejection.
Bowling, Carl D. et al., "Motion Compensated Image Coding with a Combined Maximum A Posteriori and Regression Algorithm," IEEE Transactions on Communications, New York, USA, vol. COM-33, No. 8, Aug. 1, 1985, pp. 844-857.
EP Appln. No. 03818864.5—Sep. 20, 2012 EPO Office Action.
Puri, A. et al., "Motion-compensated transform coding based on block motion-tracking algorithm," International Conferences on Communications 1987, IEEE, pp. 136-140.
Chinese Appln. No. 03816346.2—Jul. 6, 2011 SIPO Office Action (Translation).
EP Appln. No. 03723915—Aug. 1, 2011 EPO Supplementary European Search Report.
EP Appln. No. 07776613—Jul. 25, 2011 EPO Supplementary European Search Report.
JP Appln. No. 2007-518071—Sep. 6, 2011 Decision of Rejection with statement of relevancy.
U.S. Appl. No. 12/801,293—Aug. 15, 2011 PTO Office Action.
U.S. Appl. No. 10/260,534, filed Oct. 1, 2002, Dambrackas.
U.S. Appl. No. 10/434,339, filed May 9, 2003, Dambrackas.
U.S. Appl. No. 10/629,855, filed Jul. 30, 2003, Johnson et al.
U.S. Appl. No. 10/875,678, filed Jun. 24, 2004, Gilgen.
U.S. Appl. No. 10/875,679, filed Jun. 25, 2004, Gilgen.
U.S. Appl. No. 11/282,688, filed Nov. 21, 2005, Dambrackas et al.
U.S. Appl. No. 11/339,537, filed Jan. 26, 2006, Dambrackas.
U.S. Appl. No. 11/339,541, filed Jan. 26, 2006, Dambrackas.
U.S. Appl. No. 11/339,542, filed Jan. 26, 2006, Dambrackas.
U.S. Appl. No. 11/340,476, filed Jan. 27, 2006, Dambrackas.
U.S. Appl. No. 11/528,569, filed Sep. 28, 2006, Dambrackas et al.
U.S. Appl. No. 11/707,863, filed Feb. 20, 2007, Hickey et al.
U.S. Appl. No. 11/707,879, filed Feb. 20, 2007, Hickey et al.
U.S. Appl. No. 11/707,880, filed Feb. 20, 2007, Hickey et al.
U.S. Appl. No. 11/819,047, filed Jun. 25, 2007, Dambrackas.
U.S. Appl. No. 11/889,268, filed Aug. 10, 2007, Hickey et al.
U.S. Appl. No. 60/774,186, filed Feb. 17, 2006, Hickey.
U.S. Appl. No. 60/795,577, filed Apr. 28, 2006, Shelton, Gary.
U.S. Appl. No. 60/836,649, filed Aug. 10, 2006, Hickey.
U.S. Appl. No. 60/836,930, filed Aug. 11, 2006, Hickey.
U.S. Appl. No. 60/848,488, filed Sep. 29, 2006, Hickey.
"Avocent Install and Discovery Protocol Specification," Version 1.3, Avocent Corporation Jul. 9, 2003 [30 pages].
"Avocent Secure Management Protocol Specification," Version 1.8, Avocent Corporation Apr. 8, 2005 [64 pages].
CA Appln. No. 2,382,403—Dec. 8, 2009 CIPO Office Action.
CA Appln. No. 2,476,102—Apr. 16, 2009 CIPO Office Action.
CA Appln. No. 2,676,794—Feb. 12, 2010 CIPO Office Action.
Digital Semiconductor 21152 PCI-To-PCI Bridge, Data Sheet, Feb. 1996, Digital Equipment Corporation, Maynard, Mass.
Duft et al. (ed.) "Xilinx Breaks One Million-Gate Barrier with Delivery of New Virtex Series", Press Kit, Xilinx, Oct. 1998.
EP Appln. No. 057756603.6—Nov. 23, 2010 EPO Supplementary Search Report.
European Office Action in European application 99960160.2, dated Mar. 16, 2006.
European Office Action in European Application No. 99960160.2-2212 dated Nov. 15, 2006.
Hill, T. "Virtex Design Methodology Using Leonardo Spectrum 1999.1", Applications Note, Exemplar Logic Technical Marketing, Apr. 1999, Rev. 3.0, pp. 1-47.
Hsieh et al "Architectural Power Optimization by Bus Splitting", Design, Automation and Test in Europe Conference and Exhibition 2000. Proceedings, pp. 612-616.
IBM Tech. Disc. Bull. "Procedure and Design to Facilitate", Apr. 1994, vol. 37, Issue 4B, pp. 215-216.
IBM Technical Disclosure Bulletin, "Multimedia System Packaging", Sep. 1993, vol. 36, Issue 9A, pp. 525-530.
IL Appln. No. 184058—Jul. 14, 2010 Ministry of Justice Commissioner of Patents Office Action with translation.
International Preliminary Examination Report in PCT application PCT/US2003/04707, mailed Oct 1, 2004.
International Search Report and Written Opinion mailed Aug. 1, 2008 in PCT Application PCT/US05/46352.
International Search Report and Written Opinion mailed Jul. 29, 2008 in PCT Application PCT/US07/17700.
International Search Report relating to PCT/US03/04707 dated Jul. 11, 2003.
International Search Report, PCT/US99/25290 mailed Feb. 10, 2000.
International Search Report, PCT/US99/25291 mailed Feb. 7, 2000.
JP Appln. No. 2003-570573—Jul. 21, 2009 Office Action with English translation.
McCloghrie, K., "Management Information Base for Network Management of TCP/IP-based internets: MIB II," Network Working Group, Performance Systems International, (RFC 1213) Mar. 1991 [70 pages].
Mobility Electronics, Inc. Brochure for PCI Split Bridge, Scottsdale, AZ, 1999.
MY Appln. No. PI20030508—Mar. 6, 2007 MyIPO Substantive Examination Adverse Report.
MY Appln. No. PI20056038—Sep. 11, 2009 MyIPO Substantive Examination Adverse Report.
MY Appln. No. PI20056038—Aug. 30, 2010 MyIPO Substantive Examination Adverse Report.
MY Appln. No. PI20062195—Sep. 11, 2009 MyIPO Adverse Examination Report.
Official Action mailed Feb. 6, 2008 in Japanese Application No. 2003-570573 [with English translation].
PCI Local Bus Specification, Revision 2.1, Jun. 1995, The PCI Special Interest Group, Portland, Oregon.
PCT Written Opinion in PCT application PCT/US2003/04707, mailed Mar. 4, 2004.
Schutti et al. "Data Transfer between Asynchronous Clock Domains without Pain", RIIC, SNUG Europe 2000, Rev. 1.1, Feb. 2000, pp. 1-12.
Search Report and Written Opinion mailed Jul. 16, 2008 in PCT Appln. No. PCT/US2007/17699.

(56) References Cited

OTHER PUBLICATIONS

Supplementary European Search Report dated Aug. 9, 2010 in EP Appln. No. 03709132.9.
U.S. Appl. No. 11/303,031—Apr. 29, 2009 PTO Office Action.
CN Appln. No. 03816346.2—Nov. 13, 2011 Office Action (with English translation).
EP Appln. No. 03818864.5—May 8, 2009 EPO Office Action.
Supplementary European Search Report mailed Nov. 23, 2010 in EP Appln. No. 05756603.
CA Appln. No. 2,524,001—Nov. 30, 2009 CIPO Office Action.
IL Appln. No. 167787—Jul. 21, 2009 Office Action.
JP Appln. No. 2005-510478—Jul. 7, 2009 Notice of Reasons for Rejection [English translation].
JP Appln. No. 2006-271932—Oct. 6, 2009 Office Action with English summary.
U.S. Appl. No. 11/790,994—Feb. 2, 2010 PTO Office Action.
European Office Action in EP Appln. No. 057566036, dated Apr. 7, 2011 [6 pages].
U.S. Appln. No. 12/533,073—Mar. 9, 2011 PTO Office Action.
CN Appln. No. 200710167085.2—Dec. 27, 2010 SIPO Office Action translation.
JP 2007-518071—Feb. 8, 2011 JIPO Office Action.
JP Appln. No. 2007-518086—Feb. 15, 2011 JPO Office Action.
U.S. Appl. No. 11/282,688—Apr. 28, 2010 PTO Office Action.
U.S. Appl. No. 11/528,569—May 20, 2011 PTO Office Action.
U.S. Appl. No. 12/533,073—May 23, 2011 PTO Office Action.
JP Appln. No. 2007-518086—Jun. 21, 2011 JIPO Office Action.
CA Appln. No. 2,630,532—Nov. 27, 2012 CIPO Office Action.
Cagnazzo, Marco et al., "Low-Complexity Scalable Video Coding through Table Lookup VQ and Index Coding," IDMS/PROMS 2002, LNCS 2515, pp. 166-175, 2002.
EP Appln. No. 05754824.0—Sep. 14, 2012 EPO Office Action.
EP Appln. No. 06849789.0—Oct. 23, 2012 Supplementary European Search Report.
Goldberg, Morris et al., "Image Sequence Coding Using Vector Quantization," IEEE Transactions on Communications., vol. COM-34, No. 7, Jul. 1986.
MY Appln. No. PI20084298—Aug. 30, 2012 MyIPO Substantive Examination Adverse Report.
Official Letter mailed Sep. 17, 2012 in TW Appln. No. 95120039.
TW Appln. No. 94145077—May 17, 2012 Taiwanese Patent Office Official Letter.
JP Appln. No. 2005-510478—Jul. 6, 2010 Decision of Rejection (English translation).
Extended European Search Report mailed Jul. 16, 2014 in EP Appln. No. 07776448.8.
U.S. Appl. No. 10/629,855—Aug. 12, 2014 Examiner's Answer.
U.S. Appl. No. 11/889,525—Apr. 23, 2014 PTO Notice of Allowance.
U.S. Appl. No. 13/749,219—Oct. 22, 2014 PTO Office Action.
U.S. Appl. No. 13/908,647—Feb. 12, 2016 PTO Office Action.

\* cited by examiner

VIDEO COMPRESSION SYSTEM

FIELD OF THE INVENTION

This invention relates to video signal compression techniques.

BACKGROUND OF THE INVENTION

In its raw form, video is a high volume form of data. Communication bandwidth in its variety of forms can be quickly consumed by the transmission of raw video information. Video compression techniques are known that attempt to retain the highest reproducibility of the original video while reducing the data volume required to transmit the information.

One form of video compression involves run length encoding in which patterns of pixels in a serial run of pixel information are identified, encoded, and transmitted by the code rather than by the individual pixels. U.S. patent application Ser. No. 10/260,534, entitled "Video Compression System," filed on Oct. 1, 2002 (the '534 patent application) describes in some detail various kinds of run length encoding combined with some other types of novel pattern encoding. The entire contents of the '534 patent application are incorporated herein by reference. The algorithms referred to in the '534 patent application are sometimes referred to herein as "DVC compression."

Another form of video compression divides video information into larger blocks of pixels and then transmits information about the block of pixels, rather than about the individual pixels themselves. In such systems, video received by a computer or other video source is usually loaded into a frame buffer. From there, blocks of information are compared to corresponding prior frame blocks to determine whether changes have occurred within the blocks. Video compression occurs because information about blocks without detected change need not be transmitted to the receiving end. Instead, the receiving end, employing the known compression algorithm used at the compression end, assumes that the pixels within a block remain the same from frame-to-frame until told otherwise by the compression end.

In an example block-by-block algorithm 8-bit video is captured and divided into 64×16 bit blocks of video for comparison with corresponding prior blocks. When video in a block is detected as changed, the information for that block is communicated to the receiving end. If no change is detected, no transmission occurs with respect to that block.

Such algorithms are presently employed in the computer environment to permit remote access to computer systems from non-proximate workstations. Keyboard, mouse and other (low volume) serial device information is communicated from the workstation to the remote computer via a communication link, and resultant (potentially high volume) video information is communicated back from the computer to the workstation via the communication link. Such systems and the methods they employ for such communications are by now well-known to the artisan.

In that computer environment, it is important that the computer video not "lag" behind the user's keyboard and mouse movements. It is unacceptable for a user to hit a key or move a mouse and see the results of that on the workstation monitor with any perceptible lag. In the remote computer environment, that means that the serial device information must communicated to the remote computer (usually a relatively easy task due to the low data volume), the computer's video processor must act on the information to create new video, and the computer's communication system must communicate the video back to the user—all before the user can detect lag between the moment the keyboard/mouse is used and the moment the resultant video is returned.

The block-by-block video encoding is one way that the video from the computer to the workstation is moved quickly back to the workstation such that no perceptible lag exists to the user. In the computer environment, many blocks within the computer screen of information may not change from frame to frame (such as on a desktop background, word processing document background, or other "inactive" location of the computer screen). With the block-by-block encoding, such blocks could be effectively ignored by the computer when sending the video information to the workstation because the workstation would assume that the blocks were not changed unless specifically told that they had been.

Block analysis occurred by evaluating pixel values within the block. One method provided a transmission of the block whenever a block change was detected, but a more improved method provided a number of pixels that had to change before the block transmission occurred. Thus, in the situation where blocks were 64×16, for example, a threshold number of six of the 1024 pixels had to change before the block was considered different enough to warrant the block transmission. The threshold gave the system room to accommodate a noise floor such that blocks could be ignored unless a change in the number of pixels exceeded a number that might be expected in a typical, noisy environment.

The block analysis was very effective in eliminating lag between keyboard/mouse entry and the corresponding video presentation. A problem developed, however, in which blocks would experience an important substantive pixel change that would go unreported to the workstation because the substantive pixel change did not cause the block to the exceed the noise threshold of, for example, six pixels changed. Examples of such occurrences included the tip of a mouse pointer moving through one or two pixels of a block. Because the number of pixels in the block that changed (the one or two pixels defining a piece of the mouse tip, or perhaps even three or four pixels once some noisiness was taken into consideration) failed to exceed the threshold, the block changes were unreported to the workstation. The effect was a lack of clarity in the mouse tip displayed at the workstation. The same situation occurred with respect to characters in a word processing document or on the desktop. If a two or three pixels of a changed character, such as the end of the hook in an "r" stretched into a block that was otherwise unchanged, the pixels would not be communicated and the end of the "r" would be deleted.

So, if the number of pixels changed within the block was set to one for the changes to be communicated, noise within the system would cause truly unchanged blocks to be communicated anyway. But, if the number of pixels changed within the block was set to more than one, potentially important pixel changes were lost.

BRIEF SUMMARY OF THE INVENTION

Pixels are defined as N-bits of code defining the red hue, N-bits defining the green hue, and N-bits defining the blue hue of the pixel. In the prior system, if the block analysis detected any change in any of the N-bits of any of the three hues of any of the pixels in the block (for example, 1000 pixels in the 64×16 block), then the pixel was counted as changed for purposes of meeting the threshold number of pixels that had to change before the block was communicated. In the present embodiment, two different analyses are conducted on each block. First, a traditional delta is applied to the number of pixels in a block that change. The delta is referred to herein as a block change threshold and describes the number of pixels within a defined block that change from one reference (such as a frame) to another point (such as a subsequent frame). Thus, if any of the 3N bits in the RGB code change, the pixel is considered changed and counted for purposes of calculating the block change. If the block change exceeds a threshold, the block change is communicated to the receiving end.

The second analysis evaluates the contrast change of each independent pixel within the block. This second delta is referred to herein as a pixel change threshold and describes the extent in value to which a pixel change occurs. High contrast pixel changes will cause a block to be communicated to the receiving end—even though the block change threshold is not met.

The two-part analysis solves both of the problems characteristic of prior block analyses. First, if change occurs in a block solely because of pixel noise, the pixel change should be of low value and will register as a single pixel change for purposes of the block change calculation. If it is the only pixel change, the block change threshold will not be met, nor will the pixel change threshold (because the change in value is low contrast, i.e., low value). Accordingly, the noise will not cause the block to be transmitted, thereby conserving bandwidth. But, if the only pixel change is a high contrast change, then the block change threshold will not be met but the pixel change threshold will. Accordingly, the block will be transmitted even though the block change threshold was not met. Similarly, if a sweeping subtle color change occurs in the corner of a block, the pixel change threshold will not be met but the block change threshold (for number of changed pixels) will. Accordingly, the block will be appropriately communicated to reflect the subtle color change.

DETAILED DESCRIPTION OF THE INVENTION

Figure 1:
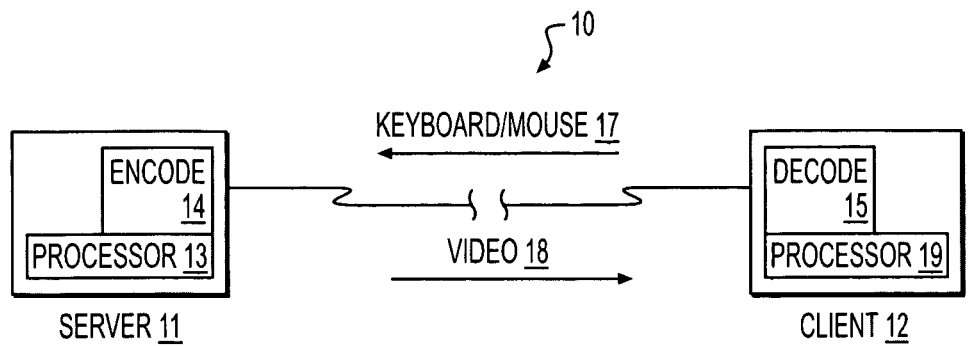
FIG. 1 is a schematic representation of an example system into which the present invention can have application.

In the computer system 10 of FIG. 1, keyboard and mouse information 17 is entered at the client 12, processed by the processor 19 at the client 12, and communicated to the server 11 via the communication channel 16. The communication channel can be a telephone line, a LAN, a WAN, the Internet, a fiber link, a wireless link or any other suitable communication system. The server 11 receives the keyboard and mouse information 17, processes it in processor 13 in accordance with an application of the server 11 and prepares an appropriate video response. The video information 18 is communicated to the client 12, which receives it, processes it in processor 19 and displays it for the client user.

The typical client user will not tolerate much delay between the time the user strikes a key or moves the mouse and the time that that user sees the resultant video on the monitor (not shown) of the client 12. Thus, the loop of information between the client 12 and server 11, together with the above-described processing, must not introduce perceptible lag. Fortunately, hardware and software for processors 19 and 13 are available to rapidly process the keyboard, mouse and video information, without introducing delay perceptible to the user. The communication channel 16, on the other hand, may impose perceptible delay unless the video information 18 is satisfactorily compressed.

For that reason, video encoder 14 and video decoder 15 are provided at, respectively, the server 11 and client 12. The video encoder 14 and decoder 15 can be a system such as that described in the '534 patent application referred to in the background above, with modifications in accordance with the following descriptions.

As described above, the encoder 14 can be a block encoder in which blocks of video information are analyzed for change to determine whether communication of the block is necessary for a particular frame. In accordance with the present invention, that determination occurs on two fronts, one based on a pixel change threshold and the other based on a block change threshold.

In the block change threshold determination, the number of pixels that change in value within the block are counted and compared to a threshold. If the number exceeds the threshold, the block is considered sufficiently changed to warrant transmission.

In the pixel change threshold determination, the value of change in each pixel is analyzed and the change values compared to a threshold. If the change value of any pixel in the block exceeds the threshold, the block is considered sufficiently changed to warrant transmission.

Transmission of "the block" can take a variety of forms, all of which are encompassed within the present invention. In the basic form, the raw pixel values for the block are communicated in serial fashion. In a more preferable form, the serial pixel values for the block are passed through the DVC compression technique of the '534 patent application for further compression. Other forms of compression are equally plausible. The present invention is not limited to any particular manner in which the block (once identified as a candidate for transmission) is transmitted from the server 11 via the channel 16 to the client 12.

Figure 2:
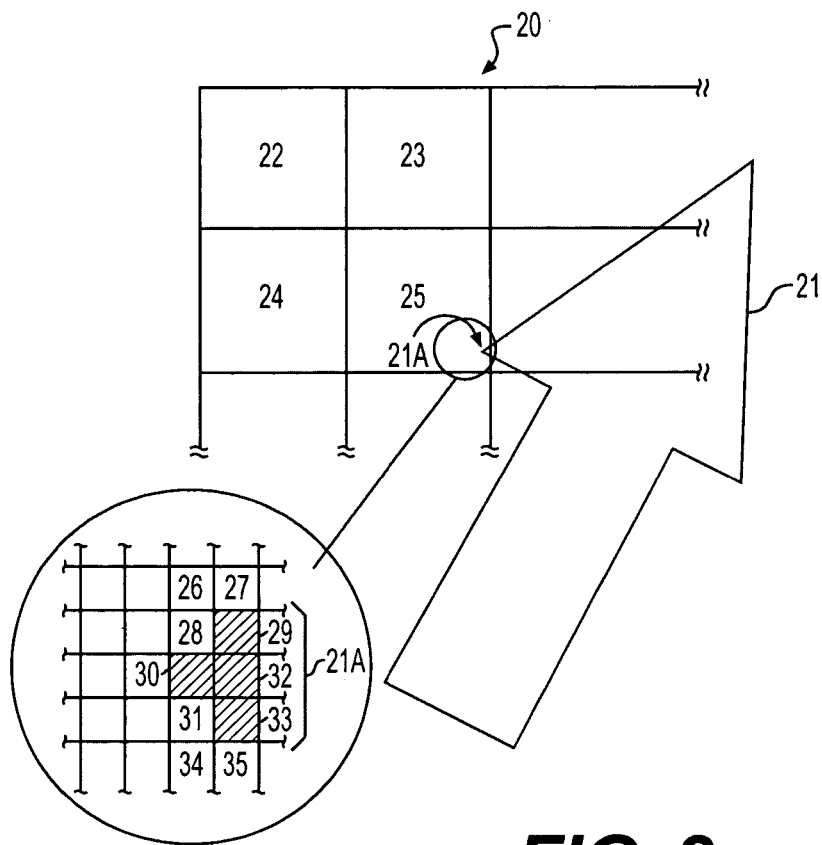
FIG. 2 is an example video frame.

FIG. 2 illustrates an example of why the present invention can be so valuable. In FIG. 2, a video screen 20 is shown in small part, with a mouse cursor 21 illustrated on the screen 20. Internally to the present system, the screen of information is divided into blocks, such as blocks 22-25. Assuming for the purpose of illustration only, that the cursor 21 is the only thing to be changed on the client user's screen and that it is moving straight upward (in the direction of the arrow shown). Assume also that in the frame shown in FIG. 2, the portion 21A of the cursor 21 just entered block 25 for the first time. That portion 21A is shown in greater detail in the bottom of FIG. 2, where the point of the cursor is drawn by pixels 29, 30, 32 and 33. Surrounding pixels 26, 27, 28, 31, 34 and 35 can be assumed to remain unchanged. As described, the block 25 would ideally have four and only four pixel changes, namely pixels 29, 30, 32 and 33 would change from background color to cursor color.

If the system used the prior art block analysis, the block 25 would not qualify for transmission because the number of changed pixels (four) would not meet the threshold (six) required for the server 11 to communicate the block change. The result means that the user of the client 12 will receive video on the monitor with block 25 unchanged, i.e., the potion 21A of the cursor 21 will be cut off. Such rounded pointer tips and other flaws in the clarity of characters are characteristic of block analysis systems.

The present invention solves that problem by combining the block threshold analysis with a substantially simultaneous pixel contrast analysis. In accordance with the preferred embodiment, the block 25 of FIG. 2 is compared to determine whether enough pixels changed, and if not, each pixel in the block 25 is evaluated to determine whether any one pixel changed enough to merit transmission of the block. In FIG. 2, the pixels 29, 30, 32, and 33, would all qualify under pixel contrast limits (assuming that the background color is not indistinguishably close to the cursor color).

The present invention is not delimited by actual number for the block count threshold. As described above, a threshold of six pixels per 64×16 block can be useful. But, so too can thresholds of less than a 6/1000 ratio, even to a threshold of 2 pixels per block of many tens or hundreds of thousands of pixels per block. The actual number is not delimiting, since the artisan with the understanding gained from this disclosure will recognize that more or less sensitivity can be achieved as desired by increasing or decreasing the threshold. Thus, the threshold that provides high noise suppression, such as requiring all of the pixels changed per block before the block is transmitted can be envisioned if, for example, the block is defined as a relatively small 2×2. The present invention is intended to cover all such threshold values, from two pixels to 100% of the pixels in a block.

Similarly, the actual pixel change threshold is not a limiting factor of the present invention in its broadest forms. Since the transmission decision is a function of both the block change threshold and the pixel change threshold, the two values should preferably be chosen to compliment each other. A relatively lower pixel change threshold causes lower contrast changes in a single pixel to trigger block transmission. A relatively higher pixel change threshold will reduce the possibility of block transmission. Design choices can be made based on such criteria as the noise floor, nominal noise spikes, the number of bits per color component, and the like such that substantive pixel changes are communicated while noise changes are not. The present invention is intended to cover all such threshold values, from a low pixel contrast delta of value=1 to a high pixel contrast delta of 50% or more of the pixel color value.

Figure 3:
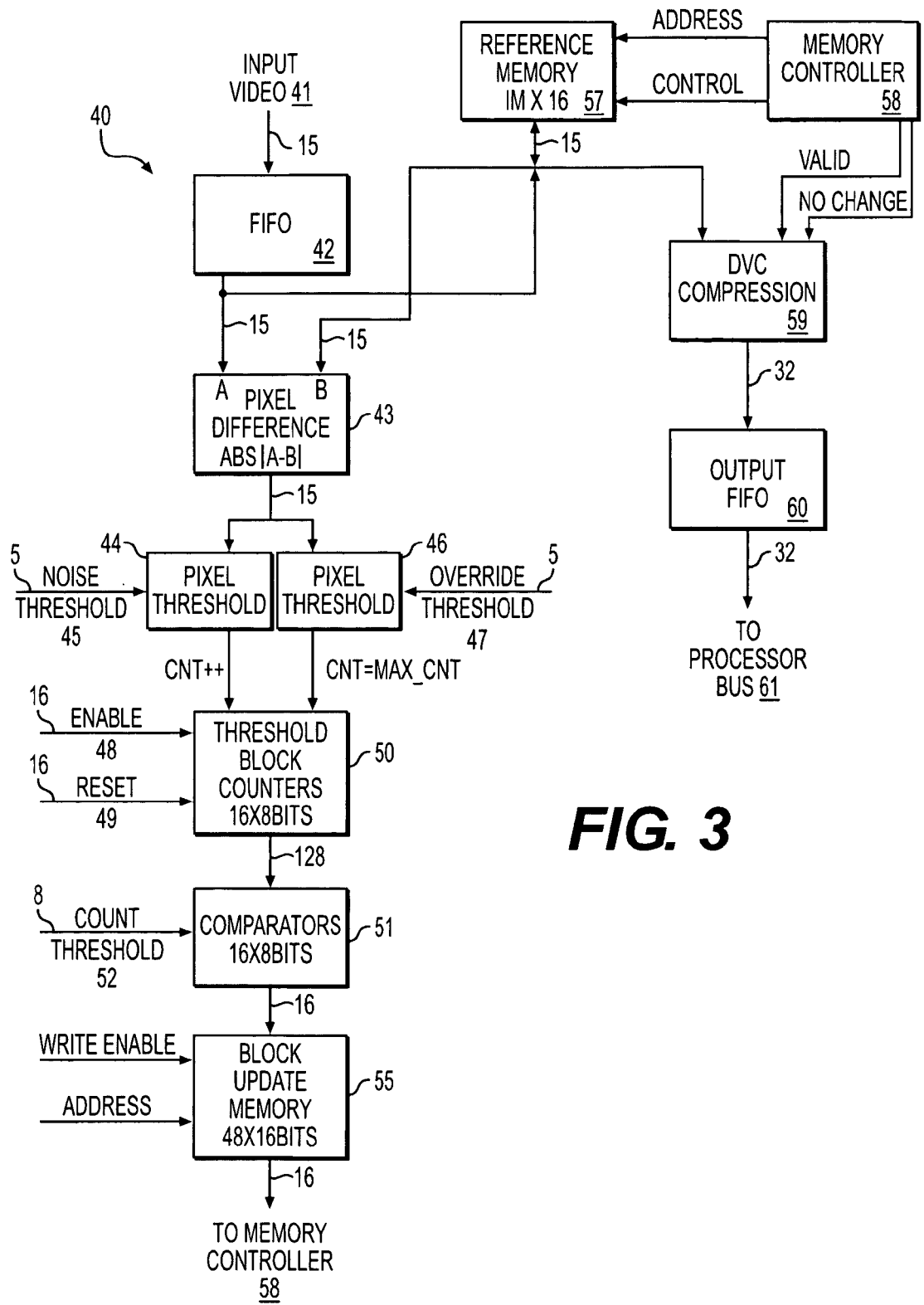
FIG. 3 is an example embodiment of the present invention.

FIG. 3 illustrates an example system and methodology for implementing the two-part threshold. Input video 41 is communicated (in 15 bit video in the example illustration of FIG. 3) to FIFO 42. FIFO 42 releases the input video to the reference memory 57 where it is stored as frames of video information. Reference memory 57 may be in this example a 1M×16 memory. The reference memory 57 stores the video information until released by the memory controller 58 via the address and control lines shown. One location that the memory controller 58 releases a frame of information to is the Pixel Difference calculator 43. In the example embodiment where one frame of information is compared to its immediately preceding frame, the memory controller 58 releases the prior frame of information from the memory 57 to the Pixel Difference calculator 43 as the FIFO 42 also communicates the current 15 bit video frame to the Pixel Difference calculator. As corresponding pixels arrive, the Pixel Difference calculator compares the absolute value of a current pixel with its counterpart in the immediately preceding frame. The value of that difference is communicated by the Pixel Difference calculator 43 to the threshold blocks 44 and 46.

Pixel Threshold Block 44 receives a noise threshold 45 which is compared to each pixel difference value received from the Pixel Difference Block 43. That is, as each pixel difference value (indicating the extent of contrast between the three 5-bit color component values of the current pixel compared to its counterpart in the immediately preceding frame) is received from the Pixel Difference Block 43, it is compared to the noise threshold to determined whether a change in the pixel value is going to be deemed to have occurred. Delta values from the Pixel Difference block 43 that fall below the noise threshold 45 will be presumed to have been unchanged, i.e., system induced rather than substantive screen image changes. The noise threshold can be a five bit signal to evaluate each of the three five bit color component values received as the difference signal from the Pixel Difference Block 43. Block 44 responds with a positive output signal to the Threshold Block Counters 50 each time the difference value received from the Pixel Difference block 43 exceeds the noise threshold. The output signal cnt++ is a count signal received by the Threshold Block Counters 50 which count the number of such signals received.

Meanwhile, the same delta value for the current pixel is received from the Pixel Difference Block 43 by the Pixel Threshold Block 46. The Pixel Threshold Block 46 compares the delta to another threshold, the "Override Threshold" 47, which it receives as the threshold over which the pixel will be said to have changed so substantively that it must be communicated to the client 12 regardless of other pixel changes within the block. When the Pixel Threshold Block 46 receives a pixel delta value that exceeds that override threshold, the block 46 communicates a number of signals to the Threshold Block Counters 50 equal to the "Count Threshold Number" 52 at which the system will send the block to the client. In other words, in the example of FIG. 3, the Threshold Block Counter 50 is tricked into counting the existence of more excessive pixel deltas than really occurred (the "true" number will still be reported by the block 44 to counter 50 although the outcome—block transmission—will have already been predestined by the block 46 report to the counter 50).

The Counter 50 counts all of the pixel reports from both the Block 44 and the Block 46 for a full block. When the block of pixels begins at the Pixel Difference Block 43, the processor (not shown in FIG. 3) enables the counter via enable line 48. At the conclusion of a block, the processor resets the counter to zero by the reset line 49. Thus, the Counter 50 is always counting the excess deltas (or the pseudo-excesses reported by the Block 46 as the case may be) in one block of video information.

The number of excess deltas counted by the Counter 50 is reported to the Comparators 51, which determine whether the counted number of excess deltas exceeded the count threshold 52 for the block reported. If they did, the Comparators 51 report the block condition (changed or unchanged) to the Block Update Memory 55, which sets a flag for each block that requires updating, i.e., communication to the receiving end. When the frame of input video 41 is completed, the Block Update Memory communicates the block identities that require communication (based on the set flags) to the memory controller 58 which causes a download of those blocks from the Reference Memory to the DVC Compression Block 59.

Once a block is identified for transmission, the memory 57 provides the blocks that require communication to the DVC Compression Block 59. The DVC Compression Block 59 receives the requisite blocks, compresses the blocks of information (per the '534 patent application disclosure), and releases the compressed stream to Output FIFO 60. The compressed stream of video can then go on the Processor Bus 61 for transmission via, for example, a communication channel interface, to the communication channel 16.

The structure of FIG. 3 is not the only embodiment into which the broad aspects of the invention can be incorporated. The structures of FIG. 3 can be completely incorporated into software modules, hardware, or a combination of both. The calculations, counting, comparisons and other functions can be performed by discrete units as shown or can be performed as a processing method within a single or multiple processing elements. The present invention is not limited to the particular kind of structure chosen to incorporate the two-threshold analysis.

Nor is the method of tricking the Counter 50 into a maximum count the only method envisioned by the present invention for determining when a block will be transmitted prior to the true count of pixel changes reaching the count threshold. Other methods could envision a direct reporting of that condition to the memory controller, or a completely independent path of processing elements for analyzing the block count versus the pixel value count.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A computer-implemented method in a data processing system for communicating video information as the video information changes from one frame to another, comprising:
   a. determining changes in pixel values within a current block of a frame of the video information;
   b. testing:
      (i) whether a change in pixel value determined in step (a) for any one of the pixels in the current block exceeds an override threshold, and
      (ii) whether a plural number of pixels in the current block that changed in pixel value by at least a noise threshold is equal to or greater than a block change threshold; and
   c. if the test of either step b.i. or step b.ii. is true, then communicating information identifying the pixel values within the block;
   d. if both conditions of steps b.i. and b.ii. are not true, then communicating a no change condition in the current block comprising communicating nothing regarding the current block; and
   decoding the video information by writing current blocks for which nothing is communicated as unchanged compared to a corresponding block in a previous frame.

2. The method according to claim 1, wherein said block change threshold is equal to the number of pixels in the current block.

3. The method according to claim 1, wherein said noise threshold is greater than one.

4. The method according to claim 1, wherein the step of transmitting comprises transmitting the information identifying the pixel values within the block to a compressor for compression prior to transmission over a communication channel.

5. A video encoder comprising:
   a pixel value analyzer analyzing pixel values within a current block of a frame of video information to determine changes in pixel values between frames;
   a comparator testing:
      (i) whether a change in pixel value determined by the pixel value analyzer for any one of the pixels in the current block exceeds a override threshold, and
      (ii) whether a plural number of pixels in the current block that changed in pixel value by at least a noise threshold is equal to or greater than a block change threshold, and
   a transmitter transmitting information identifying the pixel values within the block if the comparator determines either condition (i) or condition (ii) is true, and if the comparator determines both conditions (i) and (ii) are not true, then communicating a no change condition in the current block comprising communicating nothing regarding the current block.

6. The video encoder according to claim 5, wherein said block change threshold is equal to the number of pixels in the current block.

7. The video encoder according to claim 5, wherein said noise threshold is greater than one.

8. The video encoder according to claim 5, wherein the transmitter further comprises a compressor for compressing the pixel values within the block prior to transmission over a communication channel.

* * * * *